(12) United States Patent
Shimizu et al.

(10) Patent No.: US 11,007,700 B2
(45) Date of Patent: May 18, 2021

(54) VENTED TWIN-SCREW KNEADING EXTRUSION APPARATUS AND EXTRUSION METHOD

(71) Applicant: THE JAPAN STEEL WORKS, LTD., Tokyo (JP)

(72) Inventors: Yohei Shimizu, Hiroshima (JP); Jun Kakizaki, Hiroshima (JP); Kiyoshi Handa, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 16/809,933

(22) Filed: Mar. 5, 2020

(65) Prior Publication Data

US 2020/0215738 A1    Jul. 9, 2020

Related U.S. Application Data

(62) Division of application No. 14/902,942, filed as application No. PCT/JP2014/071556 on Aug. 18, 2014, now Pat. No. 10,625,459.

(30) Foreign Application Priority Data

Aug. 27, 2013 (JP) ................................ 2013-175245

(51) Int. Cl.
*B29B 7/94* (2006.01)
*B29C 48/76* (2019.01)
(Continued)

(52) U.S. Cl.
CPC ............ *B29C 48/767* (2019.02); *B29B 7/845* (2013.01); *B29B 7/94* (2013.01); *B29C 44/20* (2013.01);
(Continued)

(58) Field of Classification Search
USPC .......................... 366/75; 264/53; 425/376.1
See application file for complete search history.

(56) References Cited

U.S. PATENT DOCUMENTS

2002/0074685 A1   6/2002  Boudreau et al.
2002/0140127 A1   10/2002 Boudreau et al.
(Continued)

FOREIGN PATENT DOCUMENTS

EP    2 255 947    12/2010
EP    2 381 503    10/2011
(Continued)

OTHER PUBLICATIONS

International Search Report dated Sep. 9, 2014 in International (PCT) Application No. PCT/JP2014/071556.
(Continued)

*Primary Examiner* — Mark Halpern
(74) *Attorney, Agent, or Firm* — Wenderoth, Lind & Ponack, L.L.P.

(57) ABSTRACT

According to the present invention, devolatilization of a synthetic resin formed from a polymer or synthetic rubber can be improved and the synthetic resin can be foamed at a low temperature by injecting a devolatilization agent through a devolatilization agent injection nozzle provided in a downstream end segment cylinder of a cylinder assembly. In a vented twin-screw kneading extrusion apparatus and extrusion method according to the present invention, a devolatilization agent, which is injected through a downstream end devolatilization agent injection nozzle provided on a downstream end segment cylinder constituted by a segment cylinder positioned on a downstream end of a cylinder assembly, is dispersed in molten resin in the downstream end segment cylinder and kneaded by a downstream
(Continued)

end kneading portion such that the molten resin is foamed by the devolatilization agent and then extruded.

21 Claims, 2 Drawing Sheets

(51) Int. Cl.
| | |
|---|---|
| *B29B 7/84* | (2006.01) |
| *B29C 48/285* | (2019.01) |
| *B29C 48/29* | (2019.01) |
| *B29C 44/20* | (2006.01) |
| *B29C 44/34* | (2006.01) |
| *B29K 21/00* | (2006.01) |
| *B29K 7/00* | (2006.01) |
| *B29C 48/00* | (2019.01) |
| *B29C 48/03* | (2019.01) |
| *B29B 7/48* | (2006.01) |
| *B29K 105/04* | (2006.01) |

(52) U.S. Cl.
CPC .......... *B29C 44/3449* (2013.01); *B29C 48/29* (2019.02); *B29C 48/297* (2019.02); *B29B 7/483* (2013.01); *B29C 48/022* (2019.02); *B29C 48/03* (2019.02); *B29K 2007/00* (2013.01); *B29K 2021/00* (2013.01); *B29K 2105/04* (2013.01)

(56) References Cited

U.S. PATENT DOCUMENTS

| | | |
|---|---|---|
| 2002/0145227 A1 | 10/2002 | Boudreau et al. |
| 2006/0003042 A1 | 1/2006 | Inoue et al. |
| 2011/0089602 A1 | 4/2011 | Nogata et al. |
| 2012/0108782 A1 | 5/2012 | König et al. |
| 2012/0123084 A1 | 5/2012 | König et al. |
| 2012/0157653 A1 | 6/2012 | König et al. |
| 2013/0012676 A1 | 1/2013 | Hama et al. |

FOREIGN PATENT DOCUMENTS

| | | |
|---|---|---|
| JP | 8-207118 | 8/1996 |
| JP | 2000-309019 | 11/2000 |
| JP | 2000-310482 | 11/2000 |
| JP | 2001-179808 | 7/2001 |
| JP | 2002-254427 | 9/2002 |
| JP | 2002-326273 | 11/2002 |
| JP | 2006-1252 | 1/2006 |
| JP | 2013-32006 | 2/2013 |

OTHER PUBLICATIONS

Extended European Search Report dated Nov. 10, 2016 in European Application No. 14839376.2.
Office Action dated Aug. 30, 2017 in European Application No. 14839376.2.

VENTED TWIN-SCREW KNEADING EXTRUSION APPARATUS AND EXTRUSION METHOD

TECHNICAL FIELD

The present invention relates to a vented twin-screw kneading extrusion apparatus and extrusion method, and more particularly to a novel improvement with which devolatilization of a synthetic resin formed from polymers or synthetic rubbers can be improved and the synthetic resin can be foamed at a low temperature by injecting a devolatilization agent through a devolatilization agent injection nozzle provided on a downstream end segment cylinder of a cylinder assembly.

BACKGROUND ART

When devolatilization treatment is implemented on synthetic rubber, a treatment subject supplied to an extruder is typically constituted by rubber dissolved in a solvent obtained from a polymerization tank in a previous process. When the treatment is implemented using a conventional extruder, the rubber from which the solvent has been removed is pelletized by extremely reducing a throughput of the rubber per hour so as to suppress shear heating by the screw.

A configuration disclosed in Patent Document 1 may be cited as a vented twin-screw extruder used to devolatilize the solvent.

In FIG. 2, a reference symbol 1 denotes a cylinder assembly constituted by first to seventh segment cylinders 1a to 1g. The cylinder assembly 1 includes a raw material supply port 3, a first vent port 4a, and a second vent port 4b provided at intervals in sequence from an upstream side. A first devolatilization agent injection nozzle 7a and a second devolatilization agent injection nozzle 7b for injecting a devolatilization agent are provided on respective upstream sides of the first and second vent ports 4a, 4b. A first kneading portion 6a extending from the vicinity of an upstream side of the first devolatilization agent injection nozzle 7a to the vicinity of the upstream side of the first vent port 4a and a second kneading portion 6b extending similarly between the devolatilization agent nozzle 7b and the second vent port 4b are provided on two screws 2 disposed in the cylinder assembly 1.

Further, in a polymer recovery method according to Patent Document 2, not shown in the drawings, a polymer containing water is supplied to a twin-screw extruder in which a dewatering slit is provided in a bottom surface of a cylinder, and the polymer is moved through the extruder from a supply side to an discharge side while being gradually pressed and heated. The polymer is then extruded from a high pressure region to a low pressure region in an discharge side end portion of the extruder so that moisture remaining in the polymer is instantaneously vaporized, and as a result, the polymer is dried. According to this method, the extruder does not include a vent on the discharge side of the position in which the dewatering slit is installed, and therefore the extruded polymer can be foamed by the vaporized moisture and dried evenly.

Patent Document 1: Japanese Patent Application Publication No. H8-207118

Patent Document 2: Japanese Patent Application Publication No. 2000-310482

DISCLOSURE OF THE INVENTION

With the conventional vented twin-screw extruder and polymer recovery method configured as described above, the following problems occur.

With the vented twin-screw extruder of Patent Document 1, in particular when devolatilization is implemented on synthetic rubber having a low deterioration temperature, a large amount of shear heating is generated by the twin screws, and since no means is provided to reduce the temperature of the molten resin in the downstream end segment cylinder of the cylinder assembly, it is difficult to realize both high devolatilization efficiency and extrusion at a low resin temperature.

Further, in the polymer recovery method disclosed in Patent Document 2, the dewatering slit is provided on the bottom surface of the cylinder in order to remove the moisture from the polymer containing the moisture, and the polymer extruded from the downstream end of the cylinder assembly is foamed by the vaporized moisture. However, it is difficult to devolatilize a resin material being mixed together an organic solvent and a synthetic resin having a low deterioration temperature such as synthetic rubber, for which demand has increased in recent years, while making dried crumb by foam extrusion using a one extruder.

Note that here, the deterioration temperature is not a specifically defined term, but indicates a temperature at which rubber in a high-temperature, unformed condition prior to molding deteriorates, this temperature being known through experience to be approximately 100° C. higher than a limit heat resistance temperature of rubber products defined respectively by UL standards.

The present invention has been designed to solve the problems described above, and more particularly to achieve stable devolatilization and foaming of molten resin in a downstream end segment cylinder located at a downstream end of a cylinder while keeping a temperature of the molten resin low by providing a devolatilization agent injection nozzle and a downstream end kneading portion in the downstream end segment cylinder.

A vented twin-screw kneading extrusion apparatus according to the present invention removes organic volatile matter contained in molten resin, the molten resin being obtained by melting and kneading a synthetic resin raw material that is supplied through a raw material supply port on an upstream side of a cylinder constituted by a multiple segment cylinders and is formed from synthetic rubber or from two or more types of polymer including synthetic rubber, to the outside through a vent port in the cylinder, and extrudes the molten resin from a die provided on a downstream end of the cylinder, wherein a devolatilization agent, which is injected through a downstream end devolatilization agent injection nozzle provided on a downstream end segment cylinder constituted by a segment cylinder positioned on a downstream end of the cylinder assembly, is dispersed in the molten resin in the downstream end segment cylinder and kneaded by a downstream end kneading portion such that the molten resin is foamed by the devolatilization agent and then extruded. Further, the vented twin-screw kneading extrusion apparatus is configured such that a multiple devolatilization agent injection nozzles, a multiple vent ports, and a multiple kneading portions are provided between the raw material supply port and the downstream end segment cylinder of the cylinder assembly, and such that one of water, nitrogen, or carbon dioxide is used as the devolatilization agent, and such that a cylinder temperature of the downstream end segment cylinder is set to be equal to or higher than a boiling point of the devolatilization agent and lower than a limit heat resistance temperature of the synthetic rubber, and such that the devolatilization agent is injected at a ratio of 1.0% to 15% relative to the molten resin and a back pressure on an upstream side of the die equals or exceeds a vapor pressure of the devolatilization agent at the limit heat resistance temperature of the synthetic rubber, and such that the synthetic resin raw material is formed from a mixture of synthetic rubber and an organic solvent and the devolatilization agent is formed from water, and such that the die is constituted by a die having a pressure adjustment mechanism. Furthermore, a vented twin-screw kneading extrusion method according to the present invention is used to discharge organic volatile matter contained in molten resin, the molten resin being obtained by melting and kneading a synthetic resin raw material that is supplied through a raw material supply port on an upstream side of a cylinder assembly constituted by a multiple segment cylinders and is formed from synthetic rubber or from two or more types of polymer including synthetic rubber, to the outside through a vent port in the cylinder, and to extrude the molten resin from a die provided on a downstream end of the cylinder assembly, wherein a devolatilization agent, which is injected through a downstream end devolatilization agent injection nozzle provided on a downstream end segment cylinder constituted by a segment cylinder positioned on a downstream end of the cylinder assembly, is dispersed in the molten resin in the downstream end segment cylinder and kneaded by a downstream end kneading portion such that the molten resin is foamed by the devolatilization agent and then extruded. Further, the vented twin-screw kneading extrusion method is configured such that a multiple devolatilization agent injection nozzles, a multiple vent ports, and a multiple kneading portions are provided between the raw material supply port and the downstream end segment cylinder of the cylinder assembly, and such that one of water, nitrogen, or carbon dioxide is used as the devolatilization agent, and such that a cylinder temperature of the downstream end segment cylinder is set to be equal to or higher than a boiling point of the devolatilization agent and lower than a limit heat resistance temperature, and such that the devolatilization agent is injected at a ratio of 1.0% to 15% relative to the molten resin, and a back pressure on an upstream side of the die equals or exceeds a vapor pressure of the devolatilization agent at the limit heat resistance temperature of the synthetic rubber, and such that the synthetic resin raw material is formed from a mixture of synthetic rubber and an organic solvent and the devolatilization agent is formed from water, and such that the die is constituted by a die having a pressure adjustment mechanism.

With the vented twin-screw kneading extrusion apparatus and extrusion method according to the present invention, configured as described above, following effects can be obtained.

In the vented twin-screw kneading extrusion apparatus and extrusion method, with which the organic volatile matter contained in the molten resin, the molten resin being obtained by melting and kneading the synthetic resin raw material that is supplied through the raw material supply port on the upstream side of the cylinder assembly constituted by the multiple segment cylinders and is formed from a polymer or synthetic rubber, is removed to the outside through the vent port in the cylinder and the molten resin is extruded from the die provided on the downstream end of the cylinder assembly, the devolatilization agent, which is injected through the downstream end devolatilization agent injection nozzle provided on the downstream end segment cylinder constituted by the segment cylinder positioned on the downstream end of the cylinder assembly, is dispersed in the molten resin in the downstream end segment cylinder and kneaded by the downstream end kneading portion such that the molten resin is foamed by the devolatilization agent and then extruded, and therefore an improvement in the devolatilization performance can be achieved. Moreover, when the devolatilization agent is vaporized so as to foam, the synthetic resin such as synthetic rubber, which has a low decomposition temperature, is cooled by vaporization heat from the devolatilization agent, and therefore the synthetic resin can be extruded at a low temperature. As a result, it is possible to achieve both an improvement in the devolatilization performance and extrusion at a low temperature, which has conventionally been difficult.

Further, by providing the multiple devolatilization agent injection nozzles, the multiple vent ports, and the multiple kneading portions between the downstream end segment cylinder of the cylinder assembly and the raw material supply port, devolatilization and cooling of the molten resin conveyed toward the downstream end segment cylinder can be promoted.

Further, by employing water, nitrogen, carbon dioxide, or the like as the devolatilization agent, the molten resin can be devolatilized and reduced in temperature.

Further, by setting the cylinder temperature of the downstream end segment cylinder to be equal to or higher than the boiling point of the devolatilization agent and lower than the limit heat resistance temperature of the synthetic rubber, devolatilization and cooling of the synthetic rubber or the like having a low decomposition temperature can be optimized while ensuring that the raw material does not reach or exceed a deterioration temperature even when subjected to shear heating while passing through the die.

Further, by injecting the water used as the devolatilization agent at a ratio of 1.0% to 15% relative to the molten resin, and setting the back pressure on the upstream side of the die to equal or exceed the water vapor pressure at the resin melting temperature, the molten resin can be foamed with stability at a low temperature while ensuring that the devolatilization agent does not foam (sizing) in the apparatus before passing through the die.

Further, by forming the synthetic resin raw material from a mixture of synthetic rubber and an organic solvent and using water as the devolatilization agent, the synthetic rubber can be devolatilized and foam-extruded appropriately.

Further, by employing a die having a pressure adjustment mechanism as the die, a foaming condition can be adjusted extremely easily.

BEST MODES FOR CARRYING OUT THE INVENTION

An object of the present invention is to provide a vented twin-screw kneading extrusion apparatus and extrusion method with which devolatilization of a synthetic resin formed from a polymer or synthetic rubber can be improved and the synthetic resin can be foamed at a low temperature by injecting a devolatilization agent through a devolatilization agent injection nozzle provided on a downstream end segment cylinder of a cylinder assembly.

Embodiment

A preferred embodiment of the vented twin-screw kneading extrusion apparatus and extrusion method according to the present invention will be described below together with the drawings.

Note that identical or equivalent parts to the conventional example will be described using identical reference symbols.

Figure 1:
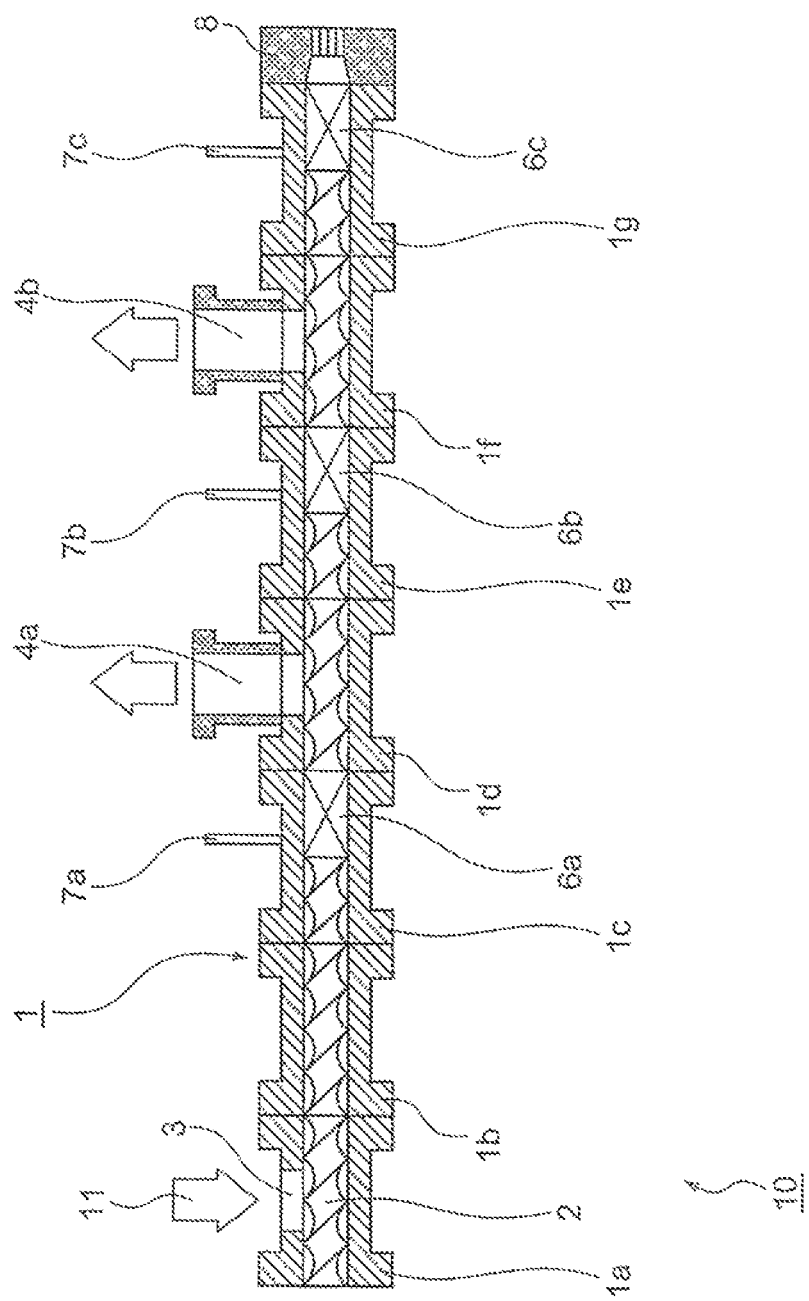
FIG. 1 is a sectional view showing a vented twin-screw kneading extrusion apparatus according to the present invention.
Figure 2:
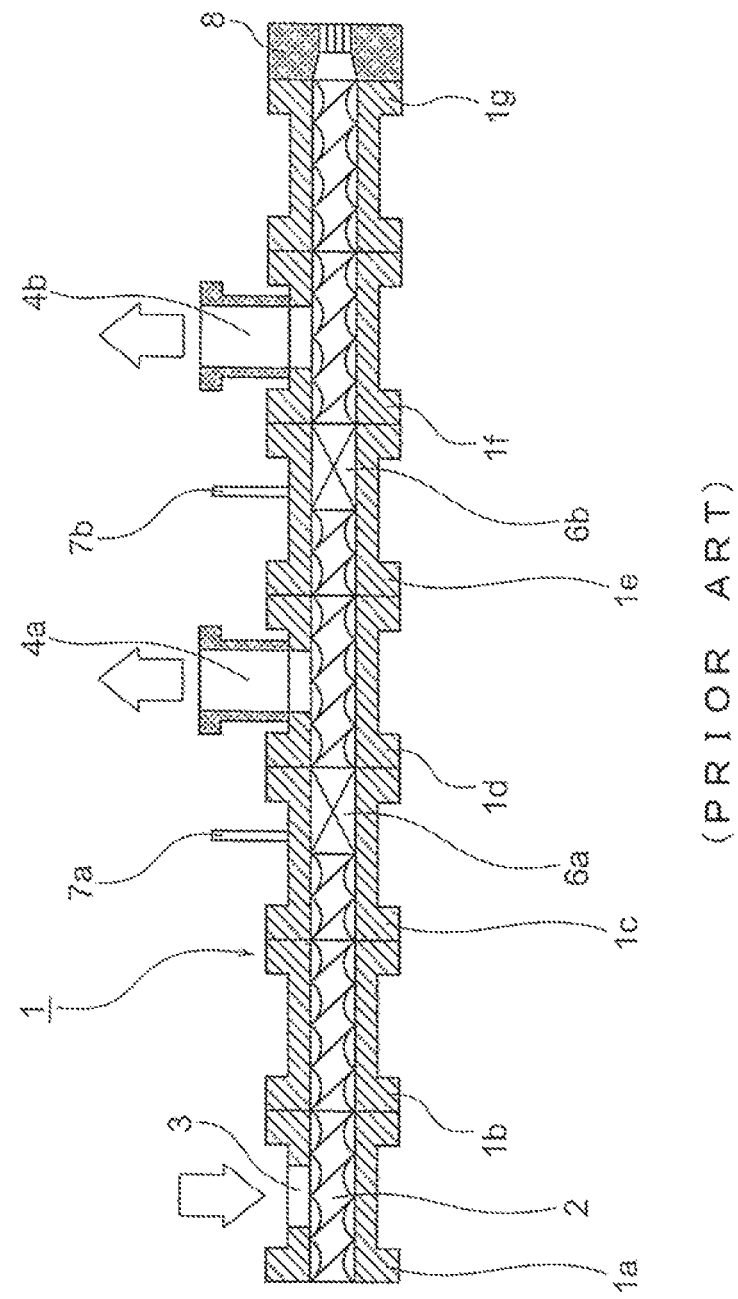
FIG. 2 is a sectional view showing a conventional vented twin-screw kneading extrusion apparatus.

In FIG. 1, a reference symbol 1 denotes an elongated, tubular cylinder having first to seventh segment cylinders 1a to 1g arranged from an upstream side toward a downstream side. A raw material supply port 3 is formed in the first segment cylinder 1a of the cylinder assembly 1, while a first devolatilization agent injection nozzle 7a and a first kneading portion 6a are provided in the third segment cylinder 1c.

A first vent port 4a is provided on the fourth segment cylinder 1d, while a second devolatilization agent injection nozzle 7b and a second kneading portion 6b are provided on the fifth segment cylinder 1e.

A second vent port 4b is provided on the sixth segment cylinder 1f, while a downstream end devolatilization agent injection nozzle 7c serving as a third devolatilization agent injection nozzle and a downstream end kneading portion 6c serving as a third kneading portion, neither of which is provided in the conventional configuration, are provided in the seventh segment cylinder 1g. Furthermore, a die 8 is provided on the seventh segment cylinder 1g on a discharge side of the downstream end kneading portion 6c.

Next, devolatilization and foam molding of a synthetic resin raw material 11 formed from a polymer or synthetic rubber using the vented twin-screw kneading extrusion apparatus according to the present invention, having the above configuration, will be described.

The synthetic resin raw material 11 is supplied to the first segment cylinder 1a through the raw material supply port 3 of the cylinder assembly 1 and conveyed to the third segment cylinder 1c while being melted in the first and second segment cylinders 1a, 1b.

In the third segment cylinder 1c, water, nitrogen, carbon dioxide, or the like is injected into the molten resin obtained by melting the synthetic resin raw material 11 through the first devolatilization agent injection nozzle 7a. Here, when water, which has the greatest latent heat of evaporation, is injected as the devolatilization agent, the devolatilization agent is dispersed in the molten resin by the first kneading portion 6a. The molten resin containing the devolatilization agent is then conveyed to the fourth segment cylinder 1d, where organic volatile matter is devolatilized to the exterior through the first vent port 4a.

After the molten resin is devolatilized through the first vent port 4a in the fourth segment cylinder 1d, the devolatilization agent is injected into the molten resin again through the second devolatilization agent injection nozzle 7b in the fifth segment cylinder 1e in a similar operation to the operation performed in the third segment cylinder 1c, whereupon the devolatilization agent is dispersed in the molten resin by the second kneading portion 6b. The molten resin containing the devolatilization agent is then conveyed to the sixth segment cylinder 1f, where the organic volatile matter contained in the molten resin is devolatilized to the exterior through the second vent port 4b.

The molten resin devolatilized in the sixth segment cylinder 1f is conveyed to the downstream end segment cylinder assembly 1g serving as the seventh segment cylinder, and in this condition the devolatilization agent is injected into the molten resin through the downstream end devolatilization agent injection nozzle 7c serving as the third devolatilization agent injection nozzle. The injected devolatilization agent is dispersed in the molten resin by the downstream end kneading portion 6c serving as the third kneading portion.

As described above, when the molten resin containing the dispersed volatilization agent is extruded into the atmosphere through the die 8 of the downstream end segment cylinder 1g, the devolatilization agent is vaporized by heat remaining in the molten resin, and as a result of this vaporization, the molten resin foams into a general crumb form.

The molten resin is cooled by latent heat of evaporation generated when the devolatilization agent is vaporized. Moreover, when the molten resin is foamed by the devolatilization agent, a devolatilization interface increases dramatically, and since the organic volatile matter remaining in the molten resin is devolatilized to the exterior of the molten resin, the molten resin can be extruded at an even lower resin temperature.

Further, it has been found as a result of various experiments that by injecting the water used as the devolatilization agent into the molten resin at a ratio of 1.0% to 15%, the temperature of the molten resin can be reduced while maintaining the devolatilization performance. Furthermore, to disperse the injected water in the liquid phase and prevent the water from foaming in the cylinder assembly 1, a back pressure on an upstream side of the die 8 must be set at or above a water vapor pressure at the molten resin temperature. A well-known die having a pressure adjustment mechanism for adjusting an opening (a surface area) of a nozzle ejection port is preferably used as the die 8. Although not shown in the drawings, a die having a pressure adjustment mechanism is conventionally configured to be capable of varying the opening surface area of the ejection port by varying a degree of overlap between two die plates, for example, and as a result, an discharge pressure of the die 8 can be adjusted.

Further, it has been confirmed from results of an experiment performed by the present applicant that the cylinder temperature of the downstream end segment cylinder 1g is related to the temperature and foaming condition of the resin extruded from the die 8. The results are as follows.

Apparatus: vented twin-screw kneading extrusion apparatus TEX65αII-28 AW-V, manufactured by The Japan Steel Works, Ltd.

Raw material: synthetic rubber (EPDM: limit heat resistance temperature 140° C., deterioration temperature 240° C.)

Additives: organic solvent+water

Experiment Results

TABLE 1

| Test data | | | | | | |
|---|---|---|---|---|---|---|
| Cylinder temperature at downstream end of extruder ° C. | Extrusion amount Q Kg/h | Screw rotation speed Ns rpm | Q/Ns | Output resin temperature ° C. | Foaming agent supply amount phr | Foaming condition |
| 200 | 100 | 100 | 1.00 | 250 | 2.0 | surging |
| 100 | 100 | 100 | 1.00 | 210 | 2.0 | stable foaming |

A decomposition temperature of the synthetic rubber used as the raw material is low, and therefore the temperature of the downstream end segment cylinder 1g is ideally kept as low as possible. As illustrated by the data on Table 1, when the downstream end segment cylinder was set at 100° C., the resin temperature serving as the outlet temperature increased to 210° C. due to shear heating at the outlet of the die 8, and it was confirmed that at this temperature, the synthetic rubber foamed with stability.

In the comparative example where the downstream end segment cylinder was set at 200° C., however, surging occurred due to evaporation of the water in the interior of the cylinder upstream of the die, and as a result, the molten resin could not be extruded with stability. Moreover, the resin temperature serving as the outlet temperature was 250° C., which exceeds the deterioration temperature.

Hence, according to the present invention, in which shear heating during extrusion is suppressed using the vaporization heat of the devolatilization agent (water) when the molten resin is extruded to the exterior from the die 8, the molten resin can be extruded with stability and without a reduction in throughput, in contrast to the conventional example. Moreover, the treated synthetic rubber is in a general crumb form, and the foaming condition thereof can be adjusted in accordance with the final devolatilization agent addition amount and the pressure in the die 8. Note that by employing a well-known die having a pressure adjustment mechanism for adjusting the opening of the nozzle ejection port as the die 8 likewise in this case, the foaming condition can be adjusted more easily, and therefore a die having a pressure adjustment mechanism is preferably used.

The embodiment described above can be summarized as follows.

In a configuration and a method employed by the vented twin-screw kneading extrusion apparatus that discharges the organic volatile matter contained in the molten resin, the molten resin being obtained by melting and kneading the synthetic resin raw material 11 that is supplied through the raw material supply port 3 on the upstream side of the cylinder assembly 1 constituted by the multiple segment cylinders 1a to 1g and is formed from synthetic rubber or from two or more types of polymer including synthetic rubber, to the outside through the vent ports 4a, 4b on the cylinder assembly 1 and extrudes the molten resin from the die 8 provided on the downstream end of the cylinder assembly 1, the devolatilization agent, which is injected through the downstream end devolatilization agent injection nozzle 7c provided on the downstream end segment cylinder constituted by the segment cylinder 1g positioned on the downstream end of the cylinder 1, is dispersed in the molten resin in the downstream end segment cylinder 1g and kneaded by the downstream end kneading portion 6c such that the molten resin is foamed by the devolatilization agent and then extruded. Further, according to the configuration and method described above, the multiple devolatilization agent injection nozzles 7a, 7b, the multiple vent ports 4a, 4b, and the multiple kneading portions 6a, 6b are provided between the raw material supply port 3 and the downstream end segment cylinder 1g of the cylinder assembly 1. Further, according to the configuration and method described above, one of water, nitrogen, and carbon dioxide is used as the devolatilization agent. Further, according to the configuration and method described above, the cylinder temperature of the downstream end segment cylinder 1g is set to be equal to or higher than a boiling point of the devolatilization agent and lower than the limit heat resistance temperature of the synthetic rubber. Further, according to the configuration and method described above, the devolatilization agent is injected at a ratio of 1.0% to 15% relative to the molten resin, and the back pressure on the upstream side of the die 8 equals or exceeds the vapor pressure of the devolatilization agent at the limit heat resistance temperature of the synthetic rubber. Further, according to the configuration and method described above, the synthetic resin raw material is formed from a mixture of synthetic rubber and an organic solvent, and the devolatilization agent is formed from water. Further, according to the configuration and method described above, the die 8 is constituted by a die having a pressure adjustment mechanism.

INDUSTRIAL APPLICABILITY

With the vented twin-screw kneading extrusion apparatus according to the present invention, a devolatilization performance achieved in relation to synthetic rubber or the like can be improved and extrusion can be performed at a low resin temperature by providing a downstream end devolatilization agent injection nozzle and a downstream end kneading portion in a downstream end segment cylinder of a cylinder.

The invention claimed is:

1. A vented twin-screw kneading extrusion apparatus that discharges organic volatile matter contained in molten resin, the molten resin being obtained by melting and kneading a synthetic resin raw material that is supplied through a raw material supply port on an upstream side of a cylinder constituted by a multiple segment cylinders and is formed from synthetic rubber or from two or more types of polymer including synthetic rubber, to the outside through a vent port in the cylinder, and that extrudes the molten resin from a die provided on a downstream end of the cylinder assembly, wherein a devolatilization agent, which is injected through a downstream end devolatilization agent injection nozzle provided on a downstream end segment cylinder constituted by a segment cylinder positioned on a downstream end of the cylinder, is dispersed in the molten resin in the downstream end segment cylinder and kneaded by a downstream end kneading portion such that the molten resin is foamed by the devolatilization agent and then extruded.

2. The vented twin-screw kneading extrusion apparatus according to claim 1, wherein a multiple devolatilization agent injection nozzles, a multiple vent ports, and a multiple kneading portions are provided between the raw material supply port and the downstream end segment cylinder of the cylinder assembly.

3. The vented twin-screw kneading extrusion apparatus according to claim 2, wherein a cylinder temperature of the downstream end segment cylinder is set to be equal to or higher than a boiling point of the devolatilization agent and lower than a limit heat resistance temperature of the synthetic rubber.

4. The vented twin-screw kneading extrusion apparatus according to claim 2, wherein the devolatilization agent is injected at a ratio of 1.0% to 15% relative to the molten resin, and a back pressure on an upstream side of the die equals or exceeds a vapor pressure of the devolatilization agent at the limit heat resistance temperature of the synthetic rubber.

5. The vented twin-screw kneading extrusion apparatus according to claim 2, wherein the synthetic resin raw material is formed from a mixture of synthetic rubber and an organic solvent, and the devolatilization agent is formed from water.

6. The vented twin-screw kneading extrusion apparatus according to claim 2, wherein the die is constituted by a die having a pressure adjustment mechanism.

7. The vented twin-screw kneading extrusion apparatus according to claim 1, wherein one of water, nitrogen, and carbon dioxide is used as the devolatilization agent.

8. The vented twin-screw kneading extrusion apparatus according to claim 7, wherein a cylinder temperature of the downstream end segment cylinder is set to be equal to or higher than a boiling point of the devolatilization agent and lower than a limit heat resistance temperature of the synthetic rubber.

9. The vented twin-screw kneading extrusion apparatus according to claim 7, wherein the devolatilization agent is injected at a ratio of 1.0% to 15% relative to the molten resin, and
    a back pressure on an upstream side of the die equals or exceeds a vapor pressure of the devolatilization agent at the limit heat resistance temperature of the synthetic rubber.

10. The vented twin-screw kneading extrusion apparatus according to claim 7, wherein the die is constituted by a die having a pressure adjustment mechanism.

11. The vented twin-screw kneading extrusion apparatus according to claim 1, wherein a cylinder temperature of the downstream end segment cylinder is set to be equal to or higher than a boiling point of the devolatilization agent and lower than a limit heat resistance temperature of the synthetic rubber.

12. The vented twin-screw kneading extrusion apparatus according to claim 11, wherein the devolatilization agent is injected at a ratio of 1.0% to 15% relative to the molten resin, and
    a back pressure on an upstream side of the die equals or exceeds a vapor pressure of the devolatilization agent at the limit heat resistance temperature of the synthetic rubber.

13. The vented twin-screw kneading extrusion apparatus according to claim 11, wherein the synthetic resin raw material is formed from a mixture of synthetic rubber and an organic solvent, and
    the devolatilization agent is formed from water.

14. The vented twin-screw kneading extrusion apparatus according to claim 11, wherein the die is constituted by a die having a pressure adjustment mechanism.

15. The vented twin-screw kneading extrusion apparatus according to claim 1, wherein the devolatilization agent is injected at a ratio of 1.0% to 15% relative to the molten resin, and
    a back pressure on an upstream side of the die equals or exceeds a vapor pressure of the devolatilization agent at the limit heat resistance temperature of the synthetic rubber.

16. The vented twin-screw kneading extrusion apparatus according to claim 15, wherein the synthetic resin raw material is formed from a mixture of synthetic rubber and an organic solvent, and
    the devolatilization agent is formed from water.

17. The vented twin-screw kneading extrusion apparatus according to claim 15, wherein the die is constituted by a die having a pressure adjustment mechanism.

18. The vented twin-screw kneading extrusion apparatus according to claim 1, wherein the synthetic resin raw material is formed from a mixture of synthetic rubber and an organic solvent, and
    the devolatilization agent is formed from water.

19. The vented twin-screw kneading extrusion apparatus according to claim 1, wherein one of water, nitrogen, and carbon dioxide is used as the devolatilization agent.

20. The vented twin-screw kneading extrusion apparatus according to claim 18, wherein the die is constituted by a die having a pressure adjustment mechanism.

21. The vented twin-screw kneading extrusion apparatus according to claim 1, wherein the die is constituted by a die having a pressure adjustment mechanism.

* * * * *